Dec. 30, 1924.
N. C. CHRISTENSEN
1,521,277
APPARATUS FOR THE CONCENTRATION OF ORES
Filed Jan. 3, 1921
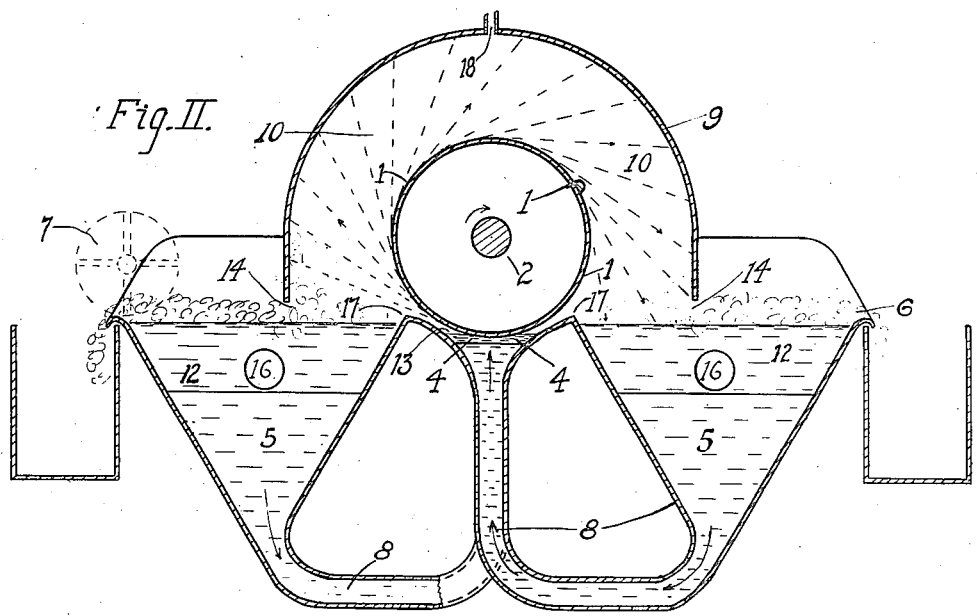
Fig. II.
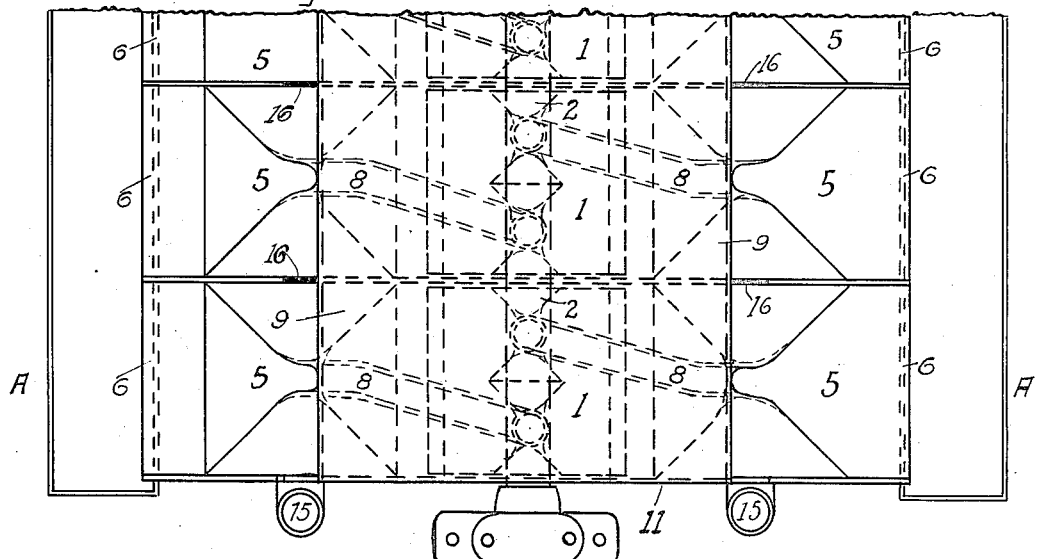
Fig. I.
INVENTOR
Niels C. Christensen Patented Dec. 30, 1924.

1,521,277

UNITED STATES PATENT OFFICE.

NIELS C. CHRISTENSEN, OF SALT LAKE CITY, UTAH.

APPARATUS FOR THE CONCENTRATION OF ORES.

Application filed January 3, 1921. Serial No. 434,607.

*To all whom it may concern:*

Be it known that I, NIELS C. CHRISTENSEN, a citizen of the United States, residing at Salt Lake City, in the county of Salt Lake and State of Utah, have invented certain new and useful Improvements in Apparatus for the Concentration of Ores, of which the following is a specification.

This invention relates to an apparatus for the concentration of ores by flotation processes or similar processes in which an aqueous pulp containing the finely ground ore is subjected to agitation and aeration and certain of the minerals are separated in the froth or scum produced by the breaking up and aeration of the pulp. My process and apparatus are useful for the treatment of sulphide ores by any of the known processes wherein a froth or scum is formed by agitation and aeration.

It is the object of my invention to secure a very efficient breaking up and aeration of the pulp by which the efficiency of the various processes is greatly enhanced and particularly to do this with the expenditure of a minimum of power and by the simplest mechanical means with a minimum of wear and tear.

As is well known, the various forms of flotation apparatus now used wherein the pulp is agitated and aerated by mechanical beating with paddles or the like, require a very large expenditure of power for efficient operation and are subject to much wear. As is also well known that the so called pneumatic cells, wherein the pulp is aerated and also agitated by the introduction of air through a porous membrane, are not efficient with regard to power consumption and are subject to troubles due to clogging of the porous medium. It is also well known that for many ores the pneumatic machines cannot compete with the forms using mechanical agitation and aeration, though more economical than the latter in power consumption.

It is the object of my invention to secure a maximum efficiency of breaking up and mixture and aeration of the pulp by mechanical means with the consumption of a very small amount of power and to avoid excessive wear and tear of the apparatus and to secure these results in a new form of machine of simple mechanical construction and operation.

I secure these results by the particular manner in which the pulp is broken up and aerated in my process, which consists in forming a spray from the pulp and throwing the spray through the air (or other gaseous medium) against a surface in the presence of the air, thereby securing the greatest possible efficiency in the breaking up and mixing and aeration of the pulp. The possibility of handling a pulp in this way is brought about by the particular manner in which the spray is formed in my apparatus. This method of making a spray from a fluid pulp consists in bringing the upper surface of a body of pulp into contact with the lower part of a smooth cylindrical surface revolving about a horizontal axis. The successful carrying out of this method of spray making consists in maintaining the surface of the body of liquid approximately tangent to the cylindrical surface so that the cylinder dips slightly into the body of liquid. The rapidly revolving cylindrical surface picks up a thin film of the fluid and throws it off in a solid fan of spray radiating from the surface of the cylinder and filling the space around the cylinder. The character and volume of the spray will vary with the depth to which the cylinder dips slightly into the liquid and with the speed of the cylinder: The deeper the cylinder dips, the greater the volume and coarser the spray, and the faster the cylinder turns the greater the volume and the finer the spray. The size of cylinder may vary according to the purpose and size of the apparatus, but I have found that a cylinder twelve inches in diameter running at from 500 to 800 R. P. M., according to the size and character of the spray described, gives excellent results. In this invention the spray thus formed impinges upon a surface surrounding the cylinder causing a further breaking up of the pulp and additional aeration. The froth or scum thus formed flows down onto and into the body of pulp and is removed by suitable overflow or skimming devices.

The manner of carrying out my process and the construction and operation of my apparatus will be made more clear by the following description and the accompanying drawings. Fig. I shows a plan view and Fig. II a vertical section on line A—A of Fig. I. The apparatus consists of a relatively smooth cylinder (1) revolving on a central horizontal axis or shaft (2) which is driven at the required speed by any suitable driving device (3). The cylinder may be of any desired length according to the capacity and time of treatment required in the machine or a number of sections of cylinder may be used. Beneath the cylinder is a trough (4) arranged so that the pulp therein will be approximately tangent to the cylinder but so the cylinder will at all times dip slightly into the pulp. This trough is parallel to the axis or drive shaft of the cylinder and the upper edges (17) of the sides are higher than the pulp level. On each side of the trough and pulley (or on one side only if desired) is a spitzkasten (5) with a suitable froth overflow (6) or if desired a skimming device (7) at the outer edge for removing the froth. The spitzkasten are connected, by means of suitable circulating pipes (8), with the bottom of the feed trough (4). Surrounding the cylinder (1) above the pulp level (13) is a suitable housing (9) forming a closed spray space (10) between it and the cylinder. At the ends of the cylinder this space is closed by suitable plates (11) through which the drive shaft (2) passes. This housing may be concentric as shown or of any other suitable shape but should be parallel to the cylinder. The sides of the housing (9) may project down into the pulp so as to compel the sprayed pulp to pass down into the body of pulp before passing out into the open quiet portion (12) of the spitzkasten or may extend nearly down to the pulp level (13) so as to leave an opening (14) between its lower edge and the surface of the pulp through which the froth may pass. The pulp is fed into the spitzkasten through suitable pipes or launders (15) and flows longitudinally from compartment to compartment through the connecting pipes or holes (16). If only a single compartment is used, and on the last compartment of a series, the pulp overflows through the pipes (16) which have a suitable overflow device arranged to maintain the pulp at the required level in the apparatus.

The operation of my process of flotation and of my apparatus is as follows: A continuous flow of pulp of the required consistency is introduced through the inflow pipes or launders (15) and allowed to flow longitudinally through the apparatus parallel to the axis (2). The required oils or other frothing or flocculating reagents in the right proportions are also continuously added to the pulp. The surface of the pulp is maintained at such a level that the cylinder (1) is approximately tangent to the surface (13) of the pulp in the trough (4). The cylinder is caused to revolve at the required speed and continuously picks up a thin film of pulp and throws it through the space (10) against the walls (9) thus thoroughly mixing and breaking up the pulp and aerating it and forming a froth which flows down into the spitzkastens (5) and is discharged at the overflow (6) or by the skimming device (7). The pulp thus discharged from the trough (4) into the spitzkastens (5) by the cylinder (1) raises the level in the latter and causes a continuous flow from the lower parts of the spitzkasten (5) through the circulating pipes (8) into trough (4) and a continuous circulation of pulp is thus maintained from the trough (4) into the spitzkastens (5) and through the circulating pipes (8) back into the trough and so on continuously through the same cycle. The mechanical efficiency of my apparatus is very high as practically all the power used is consumed directly in making the spray as there is practically no agitation of the body of pulp. The quiet spitzkasten thus secured is a great advantage in the operation of practically all flotation processes. The power consumption is so small as to be negligible compared with most mechanical flotation cells and a very high efficiency in breaking up and mixing and aeration of the pulp and resultant froth formation is secured. The mechanical operation consists merely in applying a rotary motion to the horizontal shaft which is the simplest of mechanical operations.

As will be readily seen the wear and tear on the machine is very small as compared with the mechanical flotation cells now used. It should also be particularly noted that any gasified oils or gaseous acid reagents such as $SO_2$ or any other gaseous or vaporized reagent may be introduced into the pulp by passing into the spray space (10) through suitable pipes or openings (18), through which the supply of air may also be admitted and regulated. This manner of introducing any reagent is highly efficient since the apparatus is an extremely efficient absorption device due to the intimate mixture of gaseous and fluid media and the large fluid surface exposed in the spray. The invention is therefor particularly well adapted for use for preferential and differential flotation in which gaseous reagents are used.

The simplicity and efficiency of my process and apparatus and their superiority in the matter of power consumption and wear and tear, and in the perfection of mixing and aeration and formation of a froth from the pulp, and in the ease and efficiency of the addition of air, or gaseous or vaporous reagents into the pulp as compared with present processes and apparatus will be apparent to those skilled in this art.

In the foregoing I have described the general features of my process and apparatus which may be modified in minor details without altering the general principles and I do not therefore desire to be limited entirely by the foregoing except as disclosed in the appended claims. By the term "smooth, cylindrical surface" used in the specification and claims, I mean a continuous cylindrical surface, as distinguished from one with blades or vanes or perforations. By the term "smooth" I do not mean a polished surface, but merely one free from large inequalities such as those mentioned.

Having described my process and apparatus what I claim and desire to hold is:

1. In an apparatus for concentrating ores by froth flotation, the combination of a chamber having a centrally located trough, said trough being relatively narrow as compared to the width of the sections of the chamber to each side thereof; conduits connecting the outer portions of the chamber to the bottom of the trough; a smooth imperforate cylindrical body located in line with the trough, the lower portion of the body dipping into the trough to a slight extent only; means for rotating said body; and a housing located above the body in spaced relation thereto, the side walls of the body terminating in proximity to the pulp level, and likewise being spaced away from the outer walls of the chamber.

2. In an apparatus for concentrating ores by froth flotation, the combination of a trough adapted to receive and hold the pulp to be treated, a chamber located to each side of the trough; pipes extending from the bottom of each of said chambers and upwardly into the trough, a relatively smooth cylindrical body mounted upon a horizontal axis, the lower portion whereof dips to a slight extent into the pulp in the trough; means for rotating said cylindrical body at such speed as to throw a fan of pulp drops therefrom; a housing surrounding the cylinder and spaced therefrom, thereby forming a space for the reception of the pulp spray thrown from the cylindrical member, the walls of the housing terminating in proximity to the pulp level; and means for feeding pulp to the apparatus.

3. In an apparatus for concentrating ores by froth flotation the combination of a non-corrugated, imperforate cylinder arranged to rotate while dipping slightly into pulp to be treated, in a position approximately tangent to the upper surface of the body of pulp in the hereinafter mentioned container beneath said cylinder, at such a speed as to throw a solid fan of pulp drops, radiating tangentially from the entire surface of said cylinder above said pulp level, through the hereinafter mentioned enclosed space surrounding said cylinder and against hereinafter mentioned housing; a housing surrounding said cylinder above the level of the pulp at a substantial distance away from said cylinder so as to form an unconstricted enclosed space around said cylinder and extending over a portion of hereinafter mentioned lateral containers above the pulp level and with sides extending down approximately to the pulp in said lateral containers; a container for pulp beneath said cylinder arranged to maintain the upper surface of the pulp therein in contact with the lowermost part of said cylinder; lateral froth-separating containers on both sides of first said pulp container extending laterally beyond the sides of above said housing so that pulp thrown by said cylinder against the inside of said housing will flow down into said lateral containers; channels for returning the excess of pulp from said lateral containers to first said middle container beneath said cylinder; means for allowing an overflow of froth from the portions of said lateral containers beyond the sides of said housing; means at one end of said containers for supplying pulp to be treated; and means at the other end of said containers for withdrawing the treated pulp.

In testimony whereof I have signed my name to this specification.

NIELS C. CHRISTENSEN.